United States Patent
Wu

(10) Patent No.: US 9,229,240 B2
(45) Date of Patent: Jan. 5, 2016

(54) LENS GRATING AND DISPLAY DEVICE

(71) Applicant: Boe Technology Group Co., Ltd., Beijing (CN)

(72) Inventor: Naifu Wu, Beijing (CN)

(73) Assignee: BOE TECHNOLOGY GROUP CO., LTD., Bejing (CN)

( * ) Notice: Subject to any disclaimer, the term of this patent is extended or adjusted under 35 U.S.C. 154(b) by 227 days.

(21) Appl. No.: 14/080,197

(22) Filed: Nov. 14, 2013

(65) Prior Publication Data

US 2014/0192282 A1    Jul. 10, 2014

(30) Foreign Application Priority Data

Nov. 16, 2012   (CN) .......................... 2012 1 0466212

(51) Int. Cl.

| G02F 1/1335 | (2006.01) |
|---|---|
| G02B 27/22 | (2006.01) |
| H04N 13/04 | (2006.01) |
| G02B 3/00 | (2006.01) |
| G02B 3/14 | (2006.01) |
| G02B 5/04 | (2006.01) |

(52) U.S. Cl.
CPC .......... *G02B 27/2214* (2013.01); *G02B 3/0087* (2013.01); *G02B 3/14* (2013.01); *G02B 5/045* (2013.01); *H04N 13/0404* (2013.01)

(58) Field of Classification Search
CPC .................. G02B 27/2214; H04N 13/0404
See application file for complete search history.

(56) References Cited

U.S. PATENT DOCUMENTS

| 2007/0114907 | A1 | 5/2007 | Chiang et al. |
| 2010/0026920 | A1 | 2/2010 | Kim et al. |
| 2014/0092329 | A1* | 4/2014 | Odake ................ G02B 27/2214 349/15 |

FOREIGN PATENT DOCUMENTS

| CN | 201021954 Y | 2/2008 |
| CN | 102141714 A | 8/2011 |
| CN | 102662208 A | 9/2012 |
| CN | 202929230 U | 5/2013 |
| DE | 10252830 B3 | 5/2004 |
| DE | 102009054706 A1 | 6/2011 |
| GB | 2488978 A | 9/2012 |

OTHER PUBLICATIONS

English translation of Chinese Office Action dated May 23, 2014, for corresponding Chinese Application No. CN201210466212.X.

(Continued)

*Primary Examiner* — Phu Vu

(74) *Attorney, Agent, or Firm* — Kinney & Lange, P.A.

(57) ABSTRACT

Disclosed is a lens grating comprising: a plurality of lens units arranged in a column, any two adjacent lens units having a transparent spacer therebetween, the transparent spacers in the column comprising odd-number spacers and even-number spacers, wherein the odd-number spacers only allow light emitted from first images to transmit through to a first viewing area, and the even-number spacers only allow light emitted from second images to transmit through to a second viewing area The lens units are adapted to refract the light emitted from the first images and the light emitted from the second images respectively to the first viewing area and the second viewing area. A display device is also disclosed, the display device comprising the above lens grating and a display module.

19 Claims, 3 Drawing Sheets

(56) References Cited

OTHER PUBLICATIONS

English translation of second Chinese Office Action dated Nov. 15, 2014, for corresponding Chinese Application No. CN201210466212.X.

English translation of third Chinese Office Action dated Apr. 16, 2015, for corresponding Chinese Application No. CN201210466212.X.

* cited by examiner

LENS GRATING AND DISPLAY DEVICE

CROSS-REFERENCE TO RELATED APPLICATION

This application claims the benefit of Chinese Patent Application No. 201210466212.X filed on Nov. 16, 2012 in the State Intellectual Property Office of China, the whole disclosure of which is incorporated herein by reference.

BACKGROUND OF THE INVENTION

1. Field of the Invention

The present invention relates to the field of display technology, and particularly to a lens grating and a display device.

2. Description of the Related Art

Mainstream solutions for naked-eye 3D display comprise two kinds of designs: using a parallex barrier grid and using a lens grating.

For a parallex-barrier-grid type 3D display device, as shown in FIG. 1, an opaque optical bather 102 having a longitudinal grid shape is provided on a surface of a display screen 101 to control whether or not the transmission of light so that the left eye 101a1 and the right eye 101b1 of an observer may receive different images (left-eye images 101b and right-eye images 101a), thus, a binocular parallax is produced and a 3D effect is represented. With this barrier-grid design, light from each pixel on the screen cannot enter the observer's eyes simultaneously, which results in resolution reduction and screen brightness decrease, as well as limitations on a viewing distance and a viewing angle.

For a lens-grating type 3D display device, vertically arranged grating lenses are provided at a display screen surface, and light traveling direction is controlled through refraction by the lenses so that the left eye and the right eye of an observer may receive different images simultaneously, thus, a binocular parallax is produced and a 3D effect is represented. Generally, cylindrical lenses are arranged in a single direction and are continuously and fixedly attached to the display screen surface, so the image quality will be adversely affected by the refraction of lenses, causing resolution reduction.

In the above two modes, image resolution is reduced, both image quality and screen brightness are decreased distinctly, and further, the viewing distance and the viewing angle are also limited. Therefore, the two mainstream technologies have their limitations, and how to improve image quality has become one of the key factors to improve a naked-eye 3D display technology.

SUMMARY OF THE INVENTION

The present invention has been made to overcome or alleviate at least one aspect of the above mentioned disadvantages.

According to an aspect of the present invention, there is provided a lens grating. The lens grating comprises a plurality of lens units arranged in a column, any two adjacent lens units having a transparent spacer therebetween, and the transparent spacers in the column comprising odd-number spacers and even-number spacers, wherein the odd-number spacers only allow light emitted from first images to transmit through to a first viewing area, and the even-number spacers only allow light emitted from second images to transmit through to a second viewing area; and wherein the lens units are adapted to refract the light emitted from the first images and the light emitted from the second images to the first viewing area and the second viewing area respectively.

In another exemplary embodiment according to the present invention, each lens unit has a graded refractive index distribution.

In another exemplary embodiment according to the present invention, each lens unit comprises a cylindrical lens.

In another exemplary embodiment according to the present invention, the cross section of the cylindrical lens is bounded by a straight line and a C-shape arc line both ends of which are respectively connected to both ends of the straight line, wherein the surface of the cylindrical lens where the straight line is located is arranged towards the first images and the second images.

In another exemplary embodiment according to the present invention, each lens unit comprises a prism. Further, the main section of the prism may be in a shape of an isosceles triangle whose base is disposed towards the first images and the second images, or the main section of the prism is in a shape of an isosceles trapezoid whose lower base is disposed towards the first images and the second images.

In another exemplary embodiment according to the present invention, the lens units are formed by electrically controlled liquid crystal lenses. Further, when the electrically controlled liquid crystal lenses are de-energized, their lens effect disappears. Alternatively, the lens grating comprises lens unit regions for forming the lens units and spacer regions for forming the spacers, wherein the lens unit regions are provided with electrodes, and the lens unit regions form the lens units when the electrodes are energized, while the lens effect of the electrically controlled liquid crystal lenses disappears when the electrodes are de-energized. Further alternatively, the spacers are formed by gaps between adjacent lens unit regions respectively.

In another exemplary embodiment according to the present invention, each electrically controlled liquid crystal lens has a graded refractive index distribution.

In another exemplary embodiment according to the present invention, the lens grating further comprises a transparent substrate on which the lens units are provided apart from each other.

According to another aspect of the present invention, a display device is provided. The display device includes a display module and the lens grating mentioned above.

In another exemplary embodiment according to the present invention, the display module comprises a display panel and a backlight sub-module providing backlight for the display panel, wherein the lens grating is provided at a light-output side of the display panel, or between the backlight sub-module and the display panel.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
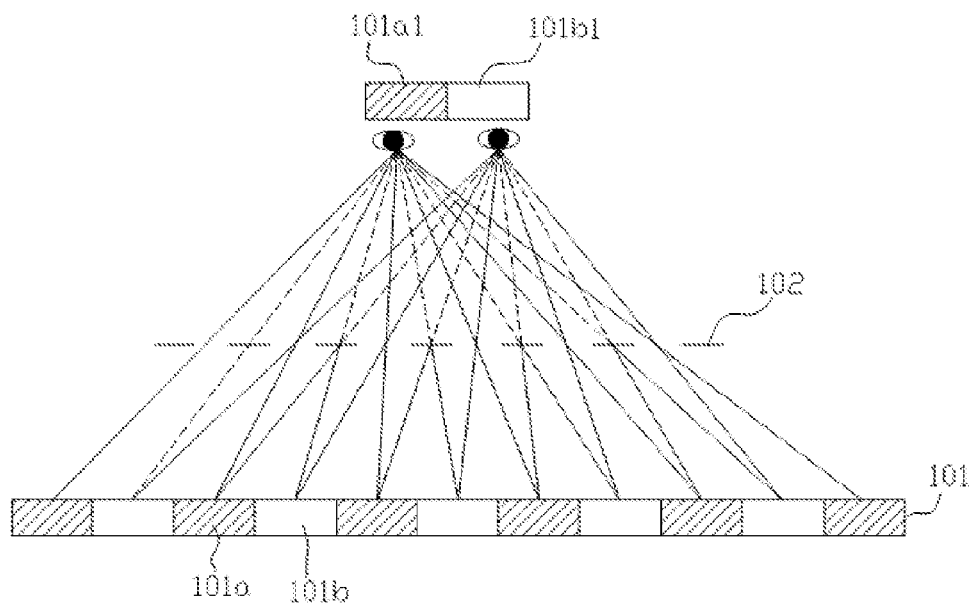
FIG. 1 is an illustrative view showing a parallex-barrier-grid type 3D display in the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

First Embodiment

In order to improve the image quality and the backlight utilization rate in a naked-eye 3D display, a first exemplary embodiment of the present invention is provided.

Figure 2:
FIG. 2 is an illustrative view showing a cross section structure of a lens grating according to an exemplary embodiment of the present invention.

As shown in FIG. 2, the present embodiment relates to a lens grating which comprises: lens units 201 and transparent spacers 202 formed between any two adjacent lens units, wherein the transparent spacers 202 in the column comprises odd-number spacers and even-number spacers, the odd-number spacers only allow light emitted from first images to transmit through and reach a corresponding first viewing area, and the even-number spacers only allow light emitted from second images to transmit through and reach a corresponding second viewing area; the lens units 201 are adapted to refract the light emitted from the first images and the light emitted from the second images respectively to the first viewing area and the second viewing area.

In the present embodiment, the lens units are used as grating bars of the lens grating, thus, light, which should have been blocked by a block portion, still enters a corresponding view area after being refracted by the lens units. In this way, compared to the conventional parallax-barrier-grid type 3D display, the backlight utilization rate and the image resolution are improved and thus a better display effect is achieved with such a lens grating; in addition, compared to a conventional continuous or full-coverage lens type 3D display, a portion of light is not refracted by the lenses, thus, an adverse effect of lenses on the image quality is reduced, and the cost for manufacturing the lens grating is decreased in some degree.

In the present embodiment, the spacer 202 is a gap or slit formed between two adjacent lens units 201.

In the present embodiment, the lens unit may have a graded refractive index distribution.

Figure 3A:
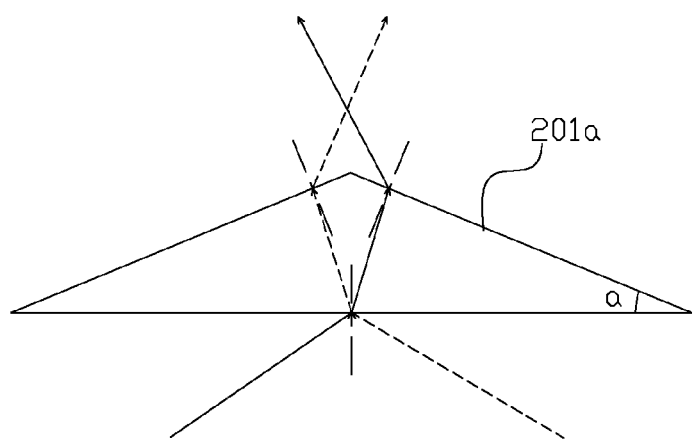
FIG. 3a, FIG. 3b and FIG. 3c are illustrative views respectively showing cross section structures of lens units of the lens gratings according to different exemplary embodiments of the present invention.
Figure 3B:
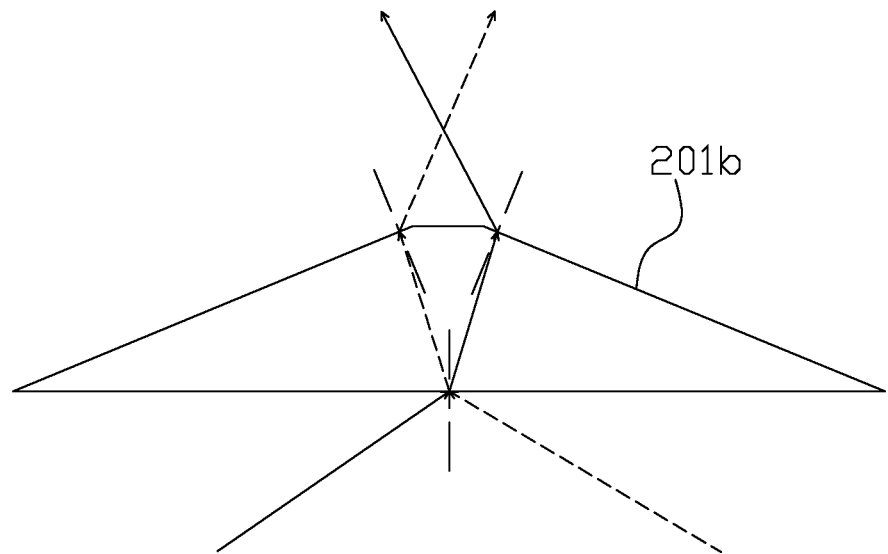

Referring to FIG. 3a and FIG. 3b, the lens unit in the present embodiment is a prism.

In the embodiment shown in FIG. 3a, the main section of the prism 201a is an isosceles triangle whose base is disposed towards the first images and the second images. The light from the left-eye images, which is incident at a surface where the base of the isosceles triangle is located, is refracted by the prism towards the left-eye viewing area (shown in dotted line in FIG. 3a), and the light from the right-eye images, which is incident at the surface where the base of the isosceles triangle is located, is refracted by the prism towards the right-eye viewing area (shown in solid line in FIG. 3a).

In an alternative embodiment of the present invention, the main section of the prism may be in other triangle shapes, as long as the gradient refractive index distribution thereof is designed to cause the light incident on the prism to be refracted to the corresponding viewing area.

In the exemplary embodiment shown in FIG. 3b, the main section of the prism 201b is an isosceles trapezoid whose lower base is disposed towards the first images and the second images. The light from the left-eye images, which is incident at a surface where the lower base of the isosceles trapezoid is located, is refracted by the prism towards the left-eye viewing area (shown in dotted line in FIG. 3b), and the light from the right-eye images, which is incident at the surface where the lower base of the isosceles trapezoid is located, is refracted by the prism towards the right-eye viewing area (shown in solid line in FIG. 3b).

In an alternative embodiment of the present invention, the main section of the prism may be in other trapezoid shapes, as long as the gradient refractive index distribution thereof is designed to cause the light incident on the prism to be refracted to the corresponding viewing area.

Figure 3C:
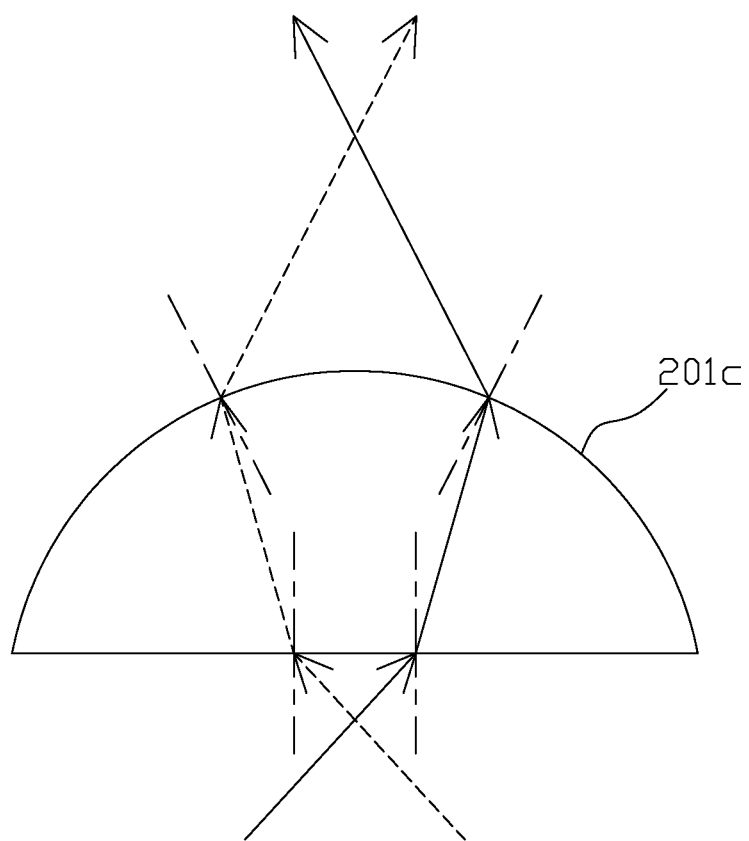

In the embodiment shown in FIG. 3c, the lens unit comprises a cylindrical prism, and the cross section of the cylindrical lens is bounded by a straight line and a C-shape arc line both ends of which are respectively connected to both ends of the straight line. For example, the lens unit is a semi-cylindrical lens 201c having a substantially semi-circular cross section. The surface where the straight line is located is disposed towards the first images and the second images. The light from the left-eye images, which is incident at a surface where the straight line is located, is refracted by the prism towards the left-eye viewing area (shown in dotted line in FIG. 3c), and the light from the right-eye images, which is incident at the surface where the straight line is located, is refracted by the prism towards the right-eye viewing area (shown in solid line in FIG. 3c).

In addition to the shapes shown in FIGS. 3a-3c, the cross section of the lens unit in other alternative embodiments of the present invention may have other shapes, as long as the gradient refractive index distributions thereof are designed to cause the light incident on the lens unit to be refracted towards the corresponding viewing area.

Since it is known in the art that light from different images is refracted towards corresponding viewing areas in a continuous cylindrical lens type 3D display device, the related contents will not be described here.

Second Embodiment

Alternatively, in order to improve the image quality and the backlight utilization rate of a naked-eye 3D display, a second exemplary embodiment of the present invention is provided.

The lens grating according to the second embodiment is similar to that mentioned in the first embodiment, and the difference therebetween only lies in that: the lens units in the second embodiment are formed by electrically controlled liquid crystal lenses, while the lens units in the first embodiment are formed by physical lenses.

The lens grating formed by the electrically controlled liquid crystal lenses may also achieve a high-quality image display, and it works as follows: the electrically controlled liquid crystal lenses, when energized, may form a lens grating having gradient refractive index distributions for obtaining the control of light splitting, like the general physical lenses, so as to function similarly to the lens grating in the first embodiment to achieve a naked-eye 3D display with high image quality and improved display brightness. In addition, when the electrically controlled liquid crystal lenses are de-energized, the lens effect of the electrically controlled liquid crystal lenses disappears, and thus the electrically controlled liquid crystal lenses represent a transparent state in which light transmits straight through the lens units to achieve a normal 2D display.

In the present embodiment, the lens grating which is formed by the electrically controlled liquid crystal lenses may be divided into lens unit regions for forming the lens units and spacer regions for forming the spacers, wherein only the lens unit regions are provided with electrodes, and the lens unit regions form the lens units when the electrodes are energized, and when the electrodes are de-energized the lens effect disappears to represent a 2D display. The spacer regions may not be provided with electrodes.

In an alternative embodiment of the present invention, the electrically controlled liquid crystal lenses are only provided at areas corresponding to the lens units, and the spacers are formed by gaps between adjacent electrically controlled liquid crystal lenses respectively.

As can be seen, in addition to the advantages produced by the lens grating according to the first embodiment, the lens grating according to the second embodiment may enable a display device to perform both a 2D display and a naked-eye 3D display.

Third Embodiment

Figure 4:
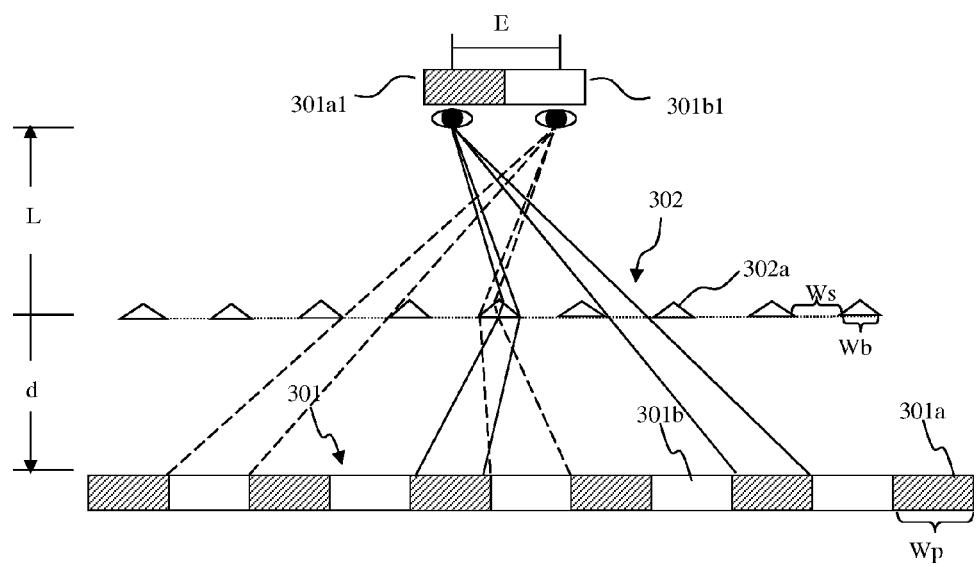
FIG. 4 is an illustrative view showing a 3D display of a display device according to an exemplary embodiment of the present invention.

Referring to FIG. 4, provided is a display device according to an exemplary of the present invention, the display device including a display module 301 and a lens grating 302. The display module 301 is used to display first images 301a and second images 301b which are arranged in a strip shape and spaced apart from each other. The lens grating 302 is the lens grating according the first embodiment or the second embodiment (only the case that the lens unit 302a is an isosceles triangle prism having a graded refractive index distribution is shown in FIG. 4). In the present embodiment, the lens grating 302 is arranged between the display module 301 and the eyes of the observer.

As shown in FIG. 4, the first images 301a are right-eye images, and the second images 301b are left-eye images.

In the present embodiment, the light (as shown in the dotted line in FIG. 4) emitted from the left-eye images 301b on the display module 301 will reach the left eye (corresponding to the left viewing area 301a1) without being blocked when it is emitted towards the left viewing area 301a1 and will be refracted by the lens unit 302a towards the left viewing area when it is emitted towards the right eye (corresponding to the right viewing area 301b1). Similarly, the light (as shown in the solid line in FIG. 4) emitted from the right-eye images 301a on the display module 301 will reach the right eye without being blocked when it is emitted towards the right viewing area 301b1 and will be refracted by the lens unit 302a towards the right viewing area when it is emitted towards the left eye.

Therefore, in the present embodiment, on one hand, the light emitted from the left-eye images and the right-eye images, which should reach the corresponding view areas, will reach directly the correspondingly left viewing area and the right viewing area respectively without refraction, and on the other hand, the light emitted from the left-eye images and the right-eye images, which should have been blocked from reaching the left viewing area and the right viewing area respectively, is refracted by the lens units 302a in the lens grating 302 to be directed to the corresponding viewing areas. With the lens grating 302, the crosstalk is reduced while the backlight utilization rate is improved and thus the display brightness of the display device employing the lens grating 302 is promoted, and at the same time, the cost for manufacturing the lens grating is decreased, compared to that of the full-coverage type lens grating, due to the decreasing of the number of the lenses.

In the present embodiment, as shown in FIG. 4, E is the pupillary distance of the observer, usually 65 mm; Wb is the width of a single lens unit 302a (that is, the distance between two adjacent slits, the width of the lens unit 302a in FIG. 4 is the length of the base line of the main section of an isosceles triangle); Ws is the width of the spacer between two adjacent lens units 302a; for a display device having K viewpoints, Wb=(K−1) Ws is satisfied; Wp is the sub-pixel width of a liquid crystal panel, L is the optimal viewing distance, and d is the distance between the lens grating 302 and the display module 301. Through calculation, the design parameters of the lens grating 302 satisfy the following relationships:

$$Ws = \frac{Wp \times E}{E + Wp}$$

$$\frac{L}{d} = \frac{E}{Wp}$$

In this embodiment, the sub-pixel width Wp=0.0565 mm; the interpupillary distance E=65 mm; K=2, thus, Ws=Wb; the viewing distance between the lens grating 302 and the eyes of the observer L=1400 mm With the above formula, Ws=Wb=0.0564 mm, the distance between the lens grating 302 and the display module 301 d=1.217 mm.

In the present embodiment, taking the lens unit 302a shown in FIG. 3a and having a main section of an isosceles triangle as an example, a is the base angle of the isosceles triangle, h is the height thereof, and Wb is the length of the base line thereof. The following formula is satisfied:

$$\tan a = \frac{2h}{Wb}$$

In the present embodiment, if the thickness of the lens grating 302 (in this embodiment, the height h of the isosceles triangle) is 0.02 mm, then the base angle a of the main section of an isosceles triangle is 35° C.

Figure 5:
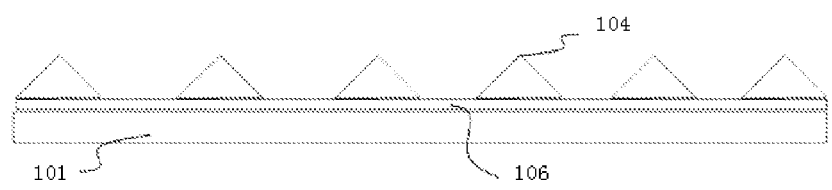
FIG. 5 is an illustrative view showing the structure of the display device according to an exemplary embodiment of the present invention.

As shown in FIG. 5, a transparent substrate 403 (such as a transparent glass substrate) may be provided between the display module 401 and the lens grating 402. A plurality of lens units 402a are attached to the transparent substrate 403 at certain intervals to form a lens grating 402 having a longitudinal prism array.

The display device in the present embodiment may be: a LCD panel, an e-paper, an OLED panel, a LCD TV, a LCD monitor, a digital photo frame, a mobile phone, a tablet PC and any other products or members having display function.

When the display module comprises a display panel forming a first image pattern and a second image pattern, and a backlight sub-module providing backlight for the display panel, the lens grating may be provided between the backlight sub-module and the display panel, or between the display panel and the eyes of the observer.

With the lens grating of the present invention, the light which should have been blocked can be refracted by the lens units and then enter corresponding viewing areas, thus, the backlight utilization rate is improved, the display brightness is promoted, and the crosstalk is reduced, and the same time, the cost for making the lens grating is decreased in comparison with the full-coverage type lens grating.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A lens grating, comprising:
a plurality of lens units arranged in a column, any two adjacent lens units having a transparent spacer therebetween, the transparent spacers in the column comprising odd-number spacers and even-number spacers,
wherein
the odd-number spacers only allow light emitted from first images to transmit through to a first viewing area, and the even-number spacers only allow light emitted from second images to transmit through to a second viewing area; and
the lens units are adapted to refract the light emitted from the first images and the light emitted from the second images to the first viewing area and the second viewing area respectively.

2. The lens grating of claim 1, wherein
each lens unit has a graded refractive index distribution.

3. The lens grating of claim 2, wherein
each lens unit comprises a cylindrical lens.

4. The lens grating of claim 3, wherein
the cross section of the cylindrical lens is bounded by a straight line and a C-shape arc line both ends of which are connected to both ends of the straight line respectively, wherein the surface of the cylindrical lens where the straight line is located is arranged towards the first images and the second images.

5. The lens grating of claim 2, wherein
each lens unit comprises a prism.

6. The lens grating of claim 5, wherein
a main section of the prism is in a shape of an isosceles triangle whose base is disposed towards the first images and the second images.

7. The lens grating of claim 5, wherein
a main section of the prism is in a shape of an isosceles trapezoid whose lower base is disposed towards the first images and the second images.

8. The lens grating of claim 1, wherein
the lens units are formed by electrically controlled liquid crystal lenses.

9. The lens grating of claim 8, wherein
the electrically controlled liquid crystal lenses are configured so that their lens effect disappears when they are de-energized.

10. The lens grating of claim 9, wherein
the lens grating comprises lens unit regions for forming the lens units and spacer regions for forming the transparent spacers, wherein the lens unit regions are provided with electrodes, and the lens unit regions form the lens units when the electrodes are energized, while the lens effect of the electrically controlled liquid crystal lenses disappears when the electrodes are de-energized.

11. The lens grating of claim 10, wherein
the transparent spacers are formed respectively by gaps between adjacent lens unit regions.

12. The lens grating of claim 8, wherein
each electrically controlled liquid crystal lens has a graded refractive index distribution.

13. The lens grating of claim 1, further comprising:
a transparent substrate on which the lens units are provided apart from each other.

14. A display device, comprising a display module and the lens grating of claim 1.

15. The display device of claim 14, wherein
the display module comprises a display panel and a backlight sub-module providing backlight for the display panel, wherein the lens grating is provided at a light-output side of the display panel, or between the backlight sub-module and the display panel.

16. The display device of claim 14, wherein
between the display module and the lens grating is provided a transparent substrate on which the lens units are provided apart from each other.

17. The display device of claim 14, wherein
the lens units are formed by electrically controlled liquid crystal lenses.

18. The display device of claim 17, wherein
the electrically controlled liquid crystal lenses are configured so that their lens effect disappears when they are de-energized.

19. The display device of claim 18, wherein
the lens grating comprises lens unit regions for forming the lens units and spacer regions for forming the spacers, wherein the lens unit regions are provided with electrodes, and the lens unit regions form the lens units when the electrodes are energized, while the lens effect of the electrically controlled liquid crystal lenses disappears when the electrodes are de-energized.

* * * * *

UNITED STATES PATENT AND TRADEMARK OFFICE
CERTIFICATE OF CORRECTION

| | | |
|---|---|---|
| PATENT NO. | : 9,229,240 B2 | Page 1 of 1 |
| APPLICATION NO. | : 14/080197 | |
| DATED | : January 5, 2016 | |
| INVENTOR(S) | : Naifu Wu | |

It is certified that error appears in the above-identified patent and that said Letters Patent is hereby corrected as shown below:

IN THE SPECIFICATION

Col. 1, Line 21
  Delete "bather"
  Insert --barrier--

Signed and Sealed this
Twelfth Day of April, 2016

Michelle K. Lee
*Director of the United States Patent and Trademark Office*